(12) United States Patent
Tscherbner

(10) Patent No.: US 8,690,253 B2
(45) Date of Patent: Apr. 8, 2014

(54) SEAT ASSEMBLY HAVING A MOVEABLE HEAD RESTRAINT ASSEMBLY

(75) Inventor: Achim Tscherbner, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 669 days.

(21) Appl. No.: 12/904,285

(22) Filed: Oct. 14, 2010

(65) Prior Publication Data

US 2011/0187174 A1   Aug. 4, 2011

(30) Foreign Application Priority Data

Feb. 4, 2010   (DE) .................. 10 2010 001 598

(51) Int. Cl.
*A47C 1/10*   (2006.01)

(52) U.S. Cl.
USPC ............... 297/408; 297/410; 297/391

(58) Field of Classification Search
USPC .................... 297/408, 410, 391
See application file for complete search history.

(56) References Cited

U.S. PATENT DOCUMENTS

| | | | |
|---|---|---|---|
| 477,197 A | 6/1892 | Baker | |
| 4,350,389 A | 9/1982 | Parsson et al. | |
| 4,353,595 A * | 10/1982 | Kaneko et al. | ........ 297/408 |
| 4,840,428 A | 6/1989 | Kobayashi et al. | |
| 4,844,544 A | 7/1989 | Ochiai | |
| 4,861,107 A | 8/1989 | Vidwans et al. | |
| 4,991,907 A | 2/1991 | Tanaka | |
| 5,026,120 A | 6/1991 | Takeda et al. | |
| 5,180,207 A | 1/1993 | Schmidt | |
| 5,531,505 A | 7/1996 | Baetz et al. | |
| 5,660,441 A | 8/1997 | Nagayasu et al. | |
| 5,683,141 A | 11/1997 | Wakamatsu et al. | |
| 6,079,776 A * | 6/2000 | Breitner et al. | ......... 297/216.12 |
| 6,129,421 A | 10/2000 | Gilson et al. | |
| 6,390,558 B2 | 5/2002 | Fischer et al. | |
| 6,722,740 B2 | 4/2004 | Imayou et al. | |
| 6,824,212 B2 * | 11/2004 | Malsch et al. | ......... 297/216.12 |
| 6,899,395 B2 | 5/2005 | Yetukuri et al. | |
| 6,983,995 B1 | 1/2006 | Veine et al. | |
| 7,073,863 B1 | 7/2006 | Low et al. | |
| 7,137,668 B2 * | 11/2006 | Kreitler | ........................ 297/410 |

(Continued)

FOREIGN PATENT DOCUMENTS

| | | |
|---|---|---|
| DE | 4328054 A1 | 2/1995 |
| DE | 19603911 | 8/1997 |

(Continued)

OTHER PUBLICATIONS

German Patent and Trademark Office, Office Action for the corresponding German Patent Application No. 10 2010 001 598.9 mailed Jul. 5, 2010.

*Primary Examiner* — Laurie Cranmer
(74) *Attorney, Agent, or Firm* — Brooks Kushman P.C.

(57) ABSTRACT

A seat assembly having a seat back, a support post disposed on the seat back, and a head restraint assembly disposed on the support post. The head restraint assembly includes a rear portion moveably disposed on the support post and a front portion pivotally disposed on the rear portion. The front portion pivots with respect to the rear portion independent of movement of the rear portion along the support post.

20 Claims, 4 Drawing Sheets

(56) References Cited

U.S. PATENT DOCUMENTS

| | | |
|---|---|---|
| 7,232,187 B1 | 6/2007 | Sundararajan et al. |
| 7,316,455 B2 | 1/2008 | Metz et al. |
| 7,758,127 B2 * | 7/2010 | Bokelmann et al. ......... 297/410 |
| 7,946,653 B2 * | 5/2011 | Robert et al. ................ 297/410 |
| 8,297,705 B2 | 10/2012 | Brunner et al. |
| 2001/0028191 A1 | 10/2001 | Lance |
| 2002/0074843 A1 * | 6/2002 | Malsch et al. ................ 297/408 |
| 2004/0070252 A1 * | 4/2004 | Stenzel et al. ................ 297/408 |
| 2007/0158990 A1 * | 7/2007 | Hermansson et al. ....... 297/408 |
| 2007/0216211 A1 | 9/2007 | Mori |
| 2008/0007105 A1 * | 1/2008 | Viger ........................... 297/408 |
| 2009/0058162 A1 | 3/2009 | Boes et al. |
| 2009/0058163 A1 | 3/2009 | Bokelmann et al. |
| 2009/0146479 A1 | 6/2009 | Boes et al. |
| 2009/0184556 A1 | 7/2009 | Bokelmann et al. |
| 2009/0218874 A1 * | 9/2009 | Meiller et al. ................ 297/408 |
| 2010/0045090 A1 * | 2/2010 | Brunner et al. .............. 297/408 |
| 2012/0126605 A1 | 5/2012 | Gross et al. |

FOREIGN PATENT DOCUMENTS

| | | | |
|---|---|---|---|
| DE | 19714283 | 11/1997 | |
| DE | 19632560 | 2/1998 | |
| DE | 19748594 A1 | 5/1999 | |
| DE | 10041533 A1 | 3/2002 | |
| DE | 10312517 A1 | 10/2004 | |
| DE | 102007048152 B3 | 1/2009 | |
| DE | 102009004554 A1 | 7/2009 | |
| FR | 2852066 | 9/2004 | |
| GB | 2302706 A | 1/1997 | |
| GB | 2340744 A | 3/2000 | |
| JP | 05269030 A * | 10/1993 | ............ A47C 7/38 |

\* cited by examiner

US 8,690,253 B2

SEAT ASSEMBLY HAVING A MOVEABLE HEAD RESTRAINT ASSEMBLY

CROSS-REFERENCE TO RELATED APPLICATIONS

This application claims foreign priority benefits under 35 U.S.C. §119(a)-(d) to DE 10 2010 001 598.9, filed Feb. 4, 2010, which is hereby incorporated by reference in its entirety.

BACKGROUND OF THE INVENTION

Field of the Invention

The present invention relates to a seat assembly and a moveable head restraint assembly.

SUMMARY OF THE INVENTION

In at least one embodiment, a seat assembly is provided. The seat assembly includes a seat back, a support post fixedly disposed on the seat back, and a head restraint assembly disposed on the support post. The head restraint assembly includes a rear portion and a front portion. The rear portion is moveably disposed on the support post. The front portion pivotally disposed on the rear portion. The front portion pivots with respect to the rear portion independent of movement of the rear portion along the support post.

In at least one embodiment, a seat assembly is provided. The seat assembly includes a seat back, a support post extending from the seat back and a headrest. The headrest has a front portion and a rear portion. The rear portion is moveably disposed on the support post and includes a first traverse member, a second traverse member and a notch rod. The first traverse member is fixedly disposed on the support post inside the rear portion. The second traverse member is moveably disposed on the support post inside the rear portion. The notch rod is disposed on the first and second traverse members. The notch rod is configured to rotate about a first axis of rotation between an unlatched position and a latched position to selectively permit and inhibit movement of the second traverse member along the support post, respectively. The front portion is disposed on the rear portion and configured to rotate about a second axis of rotation. The first axis of rotation is disposed above the second axis of rotation.

In at least one embodiment, a seat assembly is provided. The seat assembly includes a seat back, a support post disposed on the seat back and a headrest disposed above the seat back. The headrest has a rear portion disposed on the support post that includes a housing, a first traverse member, a second traverse member, a notch rod, and a latch subsystem. The first traverse member is disposed on the support post in the housing. The second traverse member is disposed on the housing. The notch rod is rotatably disposed on the first and second traverse members within the housing. The latch subsystem actuates the notch rod between an unlatched position in which the second traverse member is configured to move with respect to the first traverse member and a latched position in which the second traverse member is inhibited from moving with respect to the first traverse member.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
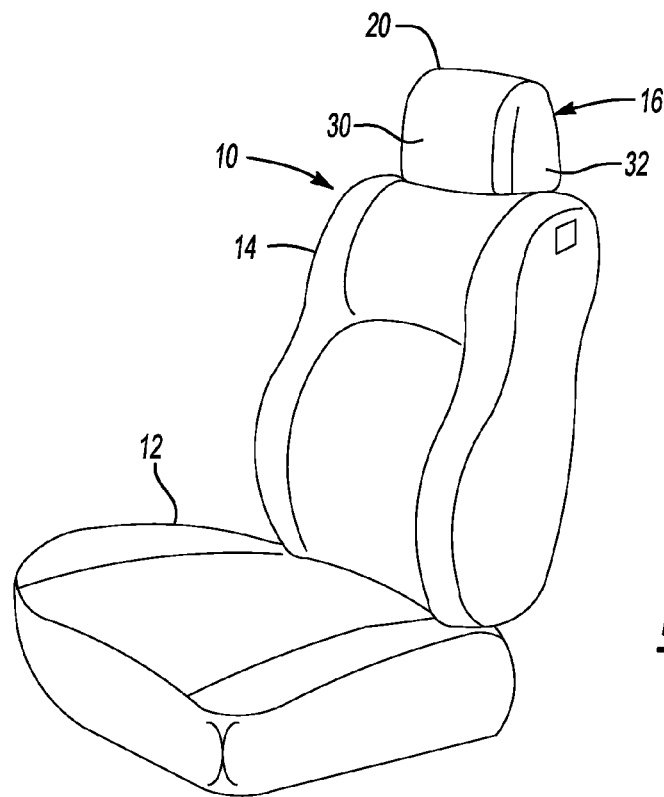
FIG. 1 is a perspective view of a seat assembly having a head restraint assembly.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Figure 2:
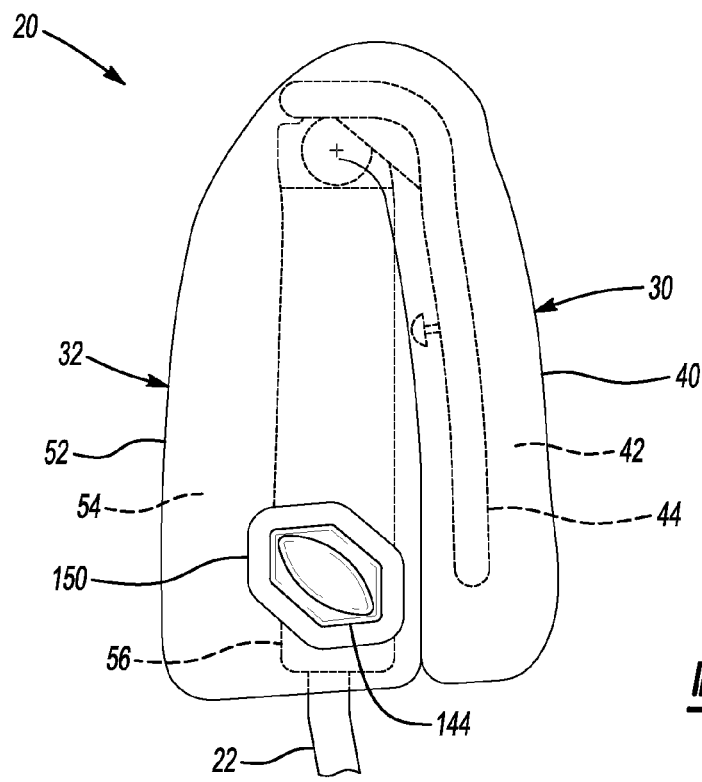
FIG. 2 is a side view of an embodiment of a head restraint assembly.
Figure 3:
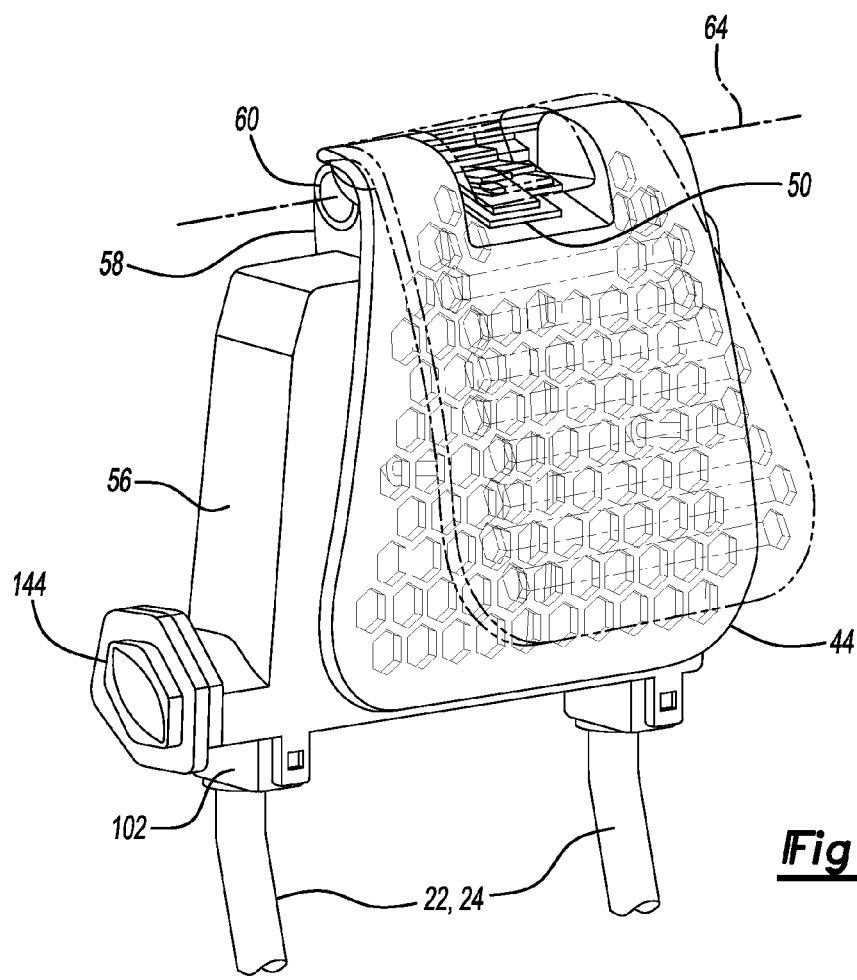
FIG. 3 is a fragmentary perspective view showing a portion of the head restraint assembly in retracted and extended positions.
Figure 4:
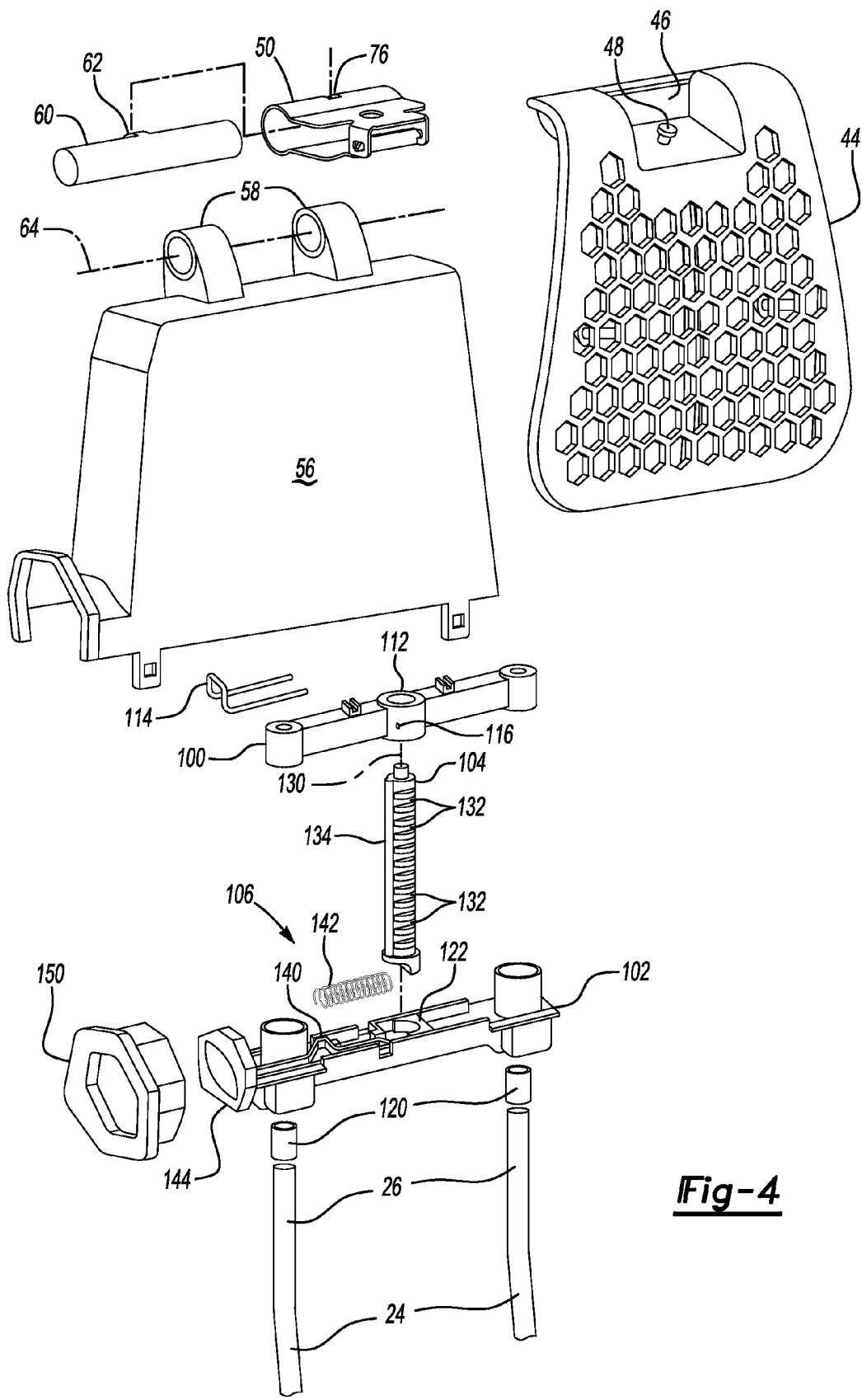
FIG. 4 is an exploded view of the head restraint assembly of FIG. 2.

Referring to FIGS. 2-4, the head restraint assembly 16 is shown in more detail. The head restraint assembly 16 may include a headrest 20 and one or more support posts 22. The headrest 20 may be moveably disposed on the support posts 22 as will be described in more detail below. The support posts 22 may be disposed on the seat back 14 may be made of any suitable material or materials, such as a metal or metal alloy. The support posts 22 may include a lower portion 24 and an upper portion 26.

The lower portion 24 may be configured as one or more tubes and may be generally linear in one or more embodiments. The lower portion 24 may extend through the top of the seat back 14. In addition, the lower portion 24 may be fixedly mounted to a structural frame of the seat back 14 such that the support posts 22 do not move with respect to the seat back 14. Alternatively, the lower portion 24 may move with respect to the seat back 14 in one or more embodiments. For instance, the lower portion 24 may be disposed in a guide sleeve that is disposed on the frame of the seat back 14.

The upper portion 26 may or may not be coaxially disposed with the lower portion 24. In at least one embodiment, the upper portion 26 may extend at an angle from the lower portion 24, such as at an obtuse angle as is best shown in FIG. 4. In at least one embodiment, the upper portion 26 may be substantially linear.

The headrest 20 may be configured to support the head of an occupant of the seat assembly 10. The headrest 20 may include a front portion 30 and a rear portion 32. The front portion 30 may be moveable with respect to the rear portion 32 as will be discussed in more detail below.

The front portion 30 may face toward the head of a seat occupant. In at least one embodiment, the front portion 30 may include a trim cover 40, a cushion 42, and a support plate 44. In FIG. 3, the front portion 30 is shown with the trim cover 40 and cushion 42 removed to better show the support plate and other components.

The trim cover 40 may cover a visible exterior surface of the front portion 30. The trim cover 40 may be made of any suitable material or materials, such as a fabric, vinyl, leather, or the like.

The cushion 42 may be disposed between the trim cover 40 and the support plate 44. In at least one embodiment, the cushion 42 may be provided by a foam-in-place manufacturing process in which foam may be injected inside the trim cover 40 and around the support plate 44 to form the cushion 42.

The support plate 44 may act as a structural member that receives and distributes load forces imparted to the front portion 30. The support plate 44 may be made of any suitable material or materials, such as a polymeric material that may be injection molded. In addition, the support plate 44 may be generally planar and includes a plurality of holes to reduce weight. In at least one embodiment, the top of the support plate 44 may be curved away from the head of a seat occupant and may include an opening 46 and a retaining feature 48 that may receive a friction clip 50 that facilitates pivotal attachment of the front portion 30 to the rear portion 32.

The rear portion 32 may be disposed on the upper portion 26 of the support post 22. As such, the rear portion 32 may be positioned adjacent to the front portion 30 but spaced apart from the head of a seat occupant. The rear portion 32 may include a trim cover 52, a cushion 54, and a housing 56.

The trim cover 52 may cover at least a portion of a visible exterior surface of the rear portion 32. The trim cover 52 may be made of any suitable material or materials, such as a fabric, vinyl, leather, or the like.

The cushion 54 may be disposed between the trim cover 52 and at least a portion of the housing 56. In at least one embodiment, the cushion 54 may be provided by a foam-in-place manufacturing process in which foam may be injected inside the trim cover 52 and outside the housing 56.

The housing 56 may be configured as a generally hollow shell that receives and/or surrounds various components that facilitate movement of the headrest 20 along the support post 22 as will be described in more detail below. The housing may be made of any suitable material, such as a polymeric material that may be injection molded, and may have any suitable configuration. In at least one embodiment, the housing 56 may have a generally rectangular cross section. In addition, the bottom of the housing 56 may be generally open to receive the internal components and to facilitate assembly.

The housing 56 may include one or more mounting features 58. In the embodiment shown, two mounting features 58 are provided that are spaced apart from each other and disposed on a top surface of the housing 56. The mounting features 58 may be configured to receive a pivot bar 60.

The pivot bar 60 may be made of any suitable material, such as a metal or metal alloy, and may have any suitable configuration. In the embodiment shown, the pivot bar 60 is generally linear and tubular. The pivot bar 60 may be fixedly attached to the housing 56 in any suitable manner. For instance, one or more mounting features 58 may be molded to the pivot bar 60 or the pivot bar 60 may be secured with fasteners or via an interference fit. As such, the pivot bar 60 may not rotate with respect to the housing 56. The pivot bar 60 may include a protrusion 62 that extends outwardly from an exterior surface of the pivot bar 60 as is best shown in FIG. 4.

In addition, the pivot bar 60 may be disposed along a first axis of rotation 64 about which the friction clip 50 and the front portion 30 may rotate.

Figure 5:
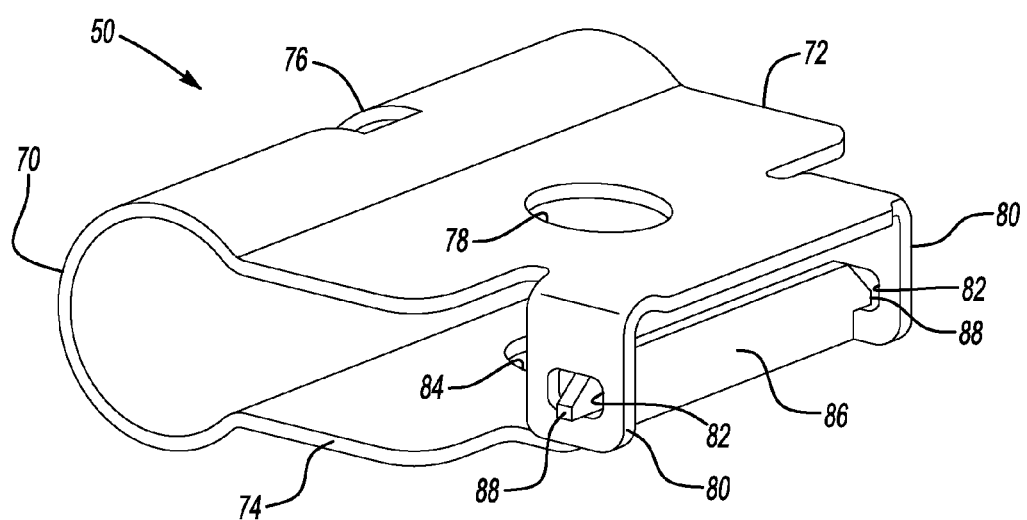
FIG. 5 is a perspective view of a friction clip of the head restraint assembly.

Referring to FIGS. 3-5, the friction clip 50 is shown in more detail. The friction clip 50 may include a curved wall 70, a first wall 72, and a second wall 74. The friction clip 50 may be made of any suitable material, such as a metal or metal alloy.

The curved wall 70 may engage and wrap partially around the pivot bar 60. The curved wall 70 may include a slot 76 that receives the protrusion 62 on the pivot bar 60.

First and second walls 72, 74 may extend from opposing ends of the curved wall 70. The first wall 72 may include a first mounting hole 78 and one or more flanges 80 that extend toward the second wall 74. The flanges 80 may extend from opposite surfaces of the first wall 72. Each flange 80 may have a flange opening 82.

The second wall 74 may include a second mounting hole 84 that is coaxially aligned with the first mounting hole 78. The second wall 74 may also include an end portion 86 that extends toward the first wall 72. The end portion 86 may have one or more barbs 88 disposed at opposite ends that may extend into the openings 82 to secure the first and second walls 72, 74 together and to squeeze the curved wall 70 against the pivot bar 60.

The friction clip 50 may be coupled to the front portion 30 in any suitable manner. For instance, the friction clip 50 may be snap-fit to the front portion 30 by inserting the retaining feature 48 or a fastener through the first and/or second mounting holes 78, 84. As such, the retaining feature 48 or fastener may fixedly secure the friction clip 50 to the front portion 30. The friction clip 50 may be is oriented at an angle relative to the front and rear portions 30, 32. For example, the friction clip 50 may be oriented at approximately a 45 degree angle relative to the planar body of the front portion 30.

The friction clip 50 may be configured to permit the front portion 30 to pivot with respect to the rear portion 32 when sufficient force is applied, yet inhibit movement of the front portion 30 when sufficient force is not applied. As such, the front portion 30 may remain in position unless sufficient force is applied to overcome the frictional resistance provided by the friction clip 50. In addition, the protrusion 62 on the pivot bar 60 may cooperate with the slot 76 on the curved wall 70 of the friction clip 50 to limit the range of travel of the front portion 30. For instance the protrusion 62 may engage one end of the slot 76 when the front portion 30 is in a retracted position and may engage an opposite end of the slot 76 when in the extended position. In the retracted position (represented by the support plate 44 shown in solid lines in FIG. 3) the front portion 30 may be disposed generally parallel to and against the rear portion 32. In the extended position (represented by the support plate shown in phantom in FIG. 3), the front portion 30 may be pivoted away from the rear portion 32 such that a free end of the front portion 30 is spaced apart from the rear portion 32. The distance or angle of travel between the retracted and extended positions may be any suitable amount. For example, the free end may be configured to travel approximately 60 mm between the retracted and extended positions.

Figure 6:
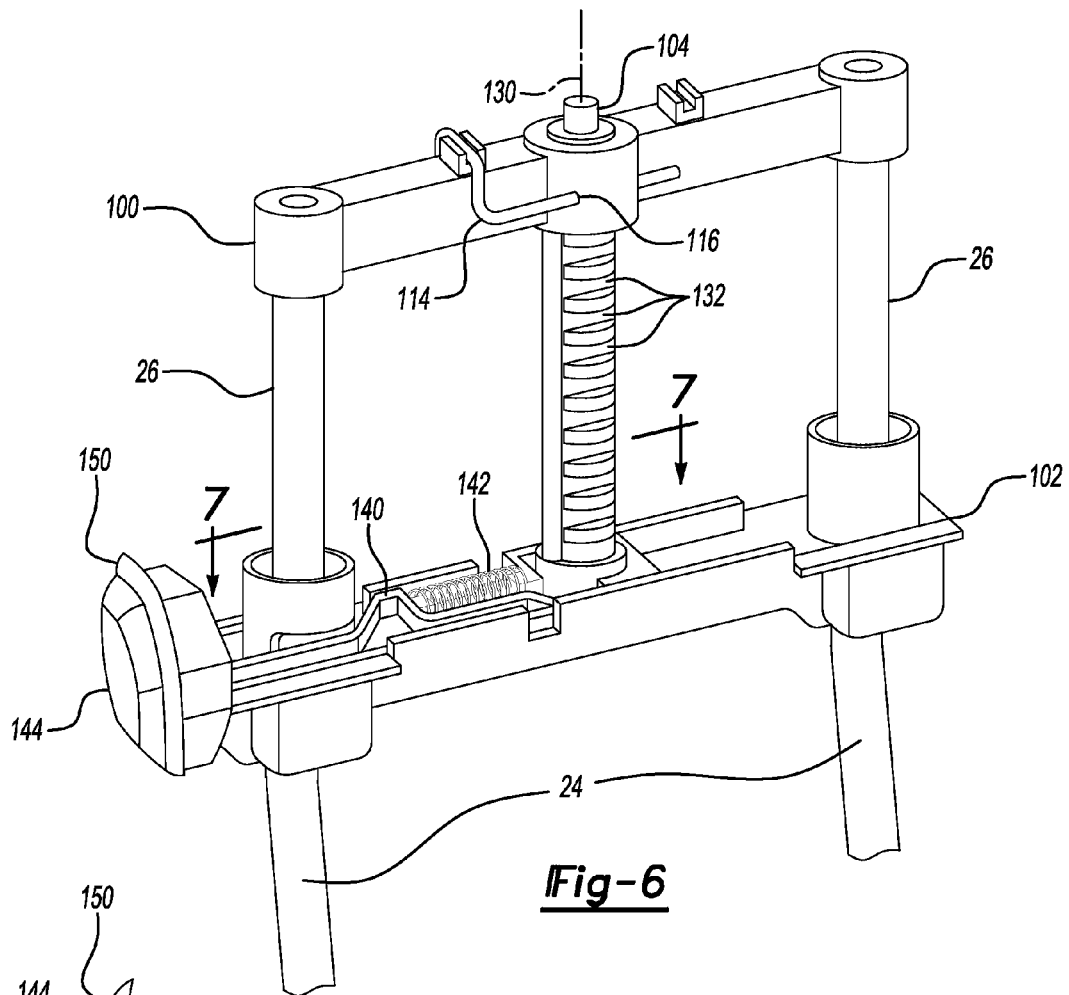
FIG. 6 is a fragmentary perspective view of a portion of the head restraint assembly.
Figure 7:
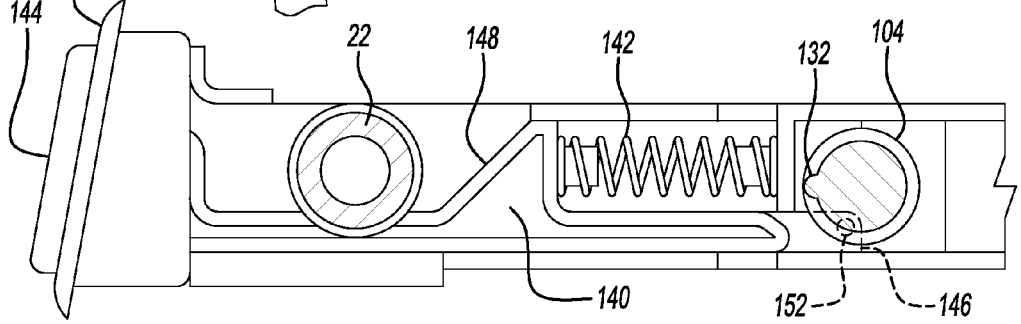
FIGS. 7 and 8 are fragmentary top views of a portion of the head restraint assembly showing a latch subsystem.

Movement of the headrest 20 along the support post 22 may occur independently of pivotal movement of the front portion 30. Movement along the support post 22 may be accomplished via various components that may be provided with the rear portion 32 of the headrest 20. Referring to FIGS. 4, 6 and 7, these components are shown in more detail. These components may include a first traverse member 100, a second traverse member 102, a notch rod 104, and a latch subsystem 106.

The first traverse member 100 may be fixedly disposed on the support post 22. For example, the first traverse member 100 may include an opening into which the upper portion 26 of the support post 22 extends. In the embodiment shown, a pair of openings is provided near opposite ends of the first traverse member 100 that each receives a support post 22. The first traverse member 100 may be secured to the support post 22 in any suitable manner, such as with a fastener like a clip or with an adhesive or interference fit. Moreover, the first traverse member 100 may be integrally formed with the support post 22 in one or more embodiments. The first traverse member 100 may be made of any suitable material, such a polymeric material that may be injection molded.

The first traverse member 100 may be configured to receive the notch rod 104. For instance, the first traverse member 100 may include an opening 112 into which the notch rod 104 may extend. The opening 112 may be disposed near the center of the first traverse member 100. In one or more embodiments, a bushing may be fixedly disposed in the opening 112 for receiving the notch rod 104.

An engagement member 114 may be disposed on the first traverse member 100 for selectively engaging the notch rod 104. The engagement member 114 may have any suitable configuration. In at least one embodiment, the engagement member 114 may be configured as a wire that extends through one or more apertures 116 in the first traverse member 100 and into the opening 112 to engage the notch rod 104. For instance, the engagement member 114 may include first and second free ends that may be disposed along opposite sides of the first traverse member 100 and/or may be disposed in different apertures 116 to permit multiple simultaneous engagement points with the notch rod 104. The aperture(s) 116 may permit the engagement member 114 to flex or move when the notch rod 104 is rotated as will be discussed in more detail below.

The second traverse member 102 may be moveably disposed on the support post 22. For example, the second traverse member 102 may include an opening through which the upper portion 26 of the support post 22 extends. In the embodiment shown, a pair of openings is provided near opposite ends of the second traverse member 102 that each receives a support post 22. A guide sleeve 120 may be fixedly disposed in each opening to receive and help guide movement of the support post 22. The second traverse member 102 may be made of any suitable material, such a polymeric material that may be injection molded. In addition, the second traverse member 102 may be disposed substantially parallel to the first traverse member 100.

The second traverse member 102 may also include a notch rod engagement feature 122 that receives and permits rotation of the notch rod 104. The engagement feature 122 may have any suitable configuration, such as a recess, protrusion, or combinations thereof, which help position the notch rod 104. In addition, the second traverse member 102 may include one or more housing engagement features, such as snap tabs, to facilitate attachment to the housing 56. The second traverse member 102 may also receive at least a portion of the latch subsystem 106 as will be discussed in more detail below.

The notch rod 104 may extend between the first and second traverse members 100, 102. For example, a first end of the notch rod 104 may extend into the opening 112 in the first traverse member 100 and a second end of the notch rod 104 may be received by or engage the engagement feature 122 in the second traverse member 102. As such, the notch rod 104 may be disposed between the support posts 22. The notch rod 104 may be made of any suitable material, such as a polymeric material, and may have any suitable configuration. For instance, the notch rod 104 may have a generally cylindrical body that may be configured to rotate about a second axis of rotation 130 and may include a plurality of notches 132 and an elongated engagement feature 134. The second axis of rotation 130 may be disposed above and may extend substantially perpendicular to and/or intersect the first axis of rotation 64.

The notches 132 may be configured to receive the engagement member 114. The notches 132 may be arranged such that they are disposed in a substantially parallel relationship between the first and second ends of the notch rod 104. The notches 132 may be arranged generally along one or more sides of the body of the notch rod 104. For instance, two sets of notches 132 may be arranged on opposite sides of the notch rod 104, such as front or back sides. Moreover the notches 132 may be arranged such that the notches 132 do not extend completely around the notch rod 104. The quantity and partitioning of the notches 132 may be selected to provide a desired number or configuration of discrete locking positions for the engagement member 114.

The elongated engagement feature 134 may generally extend between the first and second ends of the notch rod 104. The elongated engagement feature 134 may be spaced apart from the notches 132 and may be configured as a protrusion that extends outwardly from the notch rod 104. The elongated engagement feature 134 may exert force on the engagement member 122 to push the engagement member away from notches 132 when the notch rod 104 is rotated into engagement with the engagement member 122.

The latch subsystem 106 may be configured to actuate the notch rod 104. The latch subsystem 106 may include a slide rod 140 and a biasing member 142. The biasing member 142 may have any suitable configuration. For instance, the biasing member 142 may be configured as a spring.

The slide rod 140 may be moveably disposed on the second traverse member 102. For instance, the slide rod 140 may be generally disposed along an upper surface of the second traverse member 102 and may be disposed in a channel or groove that helps retain and guide movement of the slide rod 140. The slide rod 140 may have a first end 144, a second end 146 disposed opposite the first end 144, and a slide rod protrusion 148.

The first end 144 may be configured as an enlarged button that may visible from an exterior surface of the headrest 20. For example, the first end 144 may extend through a hole defined by the housing 56 and/or second traverse member 102. A bezel 150 may be provided that extends at least partially around the first end 144 to facilitate mounting and help provide a desired aesthetic appearance.

The second end 146 may be configured to engage the notch rod 104. For instance, the second end 146 may include a pin 152 that is received by the notch rod 104 to permit the notch rod 104 to rotate in response to linear actuation of the slide rod 140. As such, the second end 146 may remain in continuous engagement with the notch rod 104 to inhibit the slide rod 140 from sliding out of the headrest 20. Alternatively, the slide rod 140 may be configured to disengage from the notch rod 104 in other embodiments.

The slide rod protrusion 148 may be configured to engage the biasing member 142. In at least one embodiment, the slide rod protrusion 148 may be spaced apart from the notch rod 104 such that the biasing member 142 is disposed between the slide rod protrusion 148 and part of the second traverse member 102. The biasing member 142 may exert a biasing force against the slide rod protrusion 148 in a direction that extends away from the notch rod 104.

Figure 8:
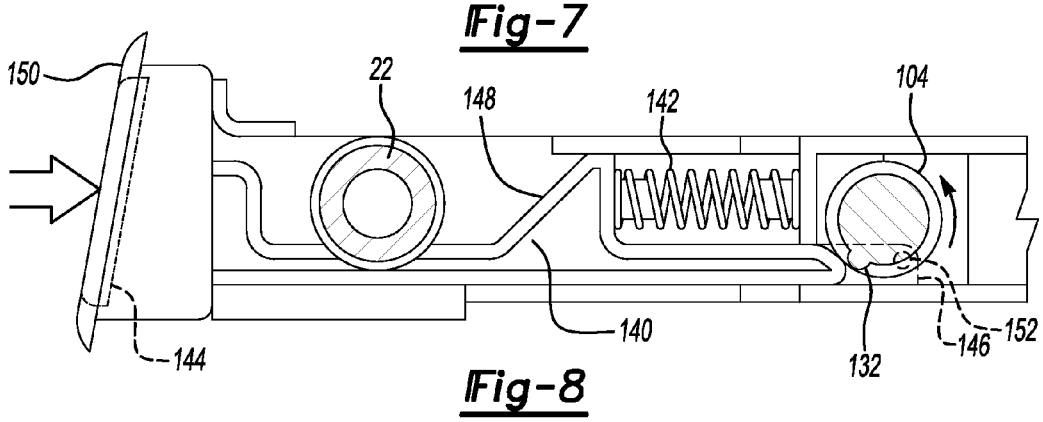

Operation of the latch subsystem 106 will now be described in greater detail. In FIGS. 5 and 7, the notch rod 104 is shown in a latched position. In the latched position, the notch rod 104 is oriented such that the notch rod engagement feature 122 may be received in a notch 132. The slide rod 140 may rotate the notch rod from the latched position toward an unlatched position as shown in FIG. 8 when sufficient force is applied to the slide rod 140. For instance, the notch rod 104 may rotate about the second axis of rotation 130 when sufficient force is applied to the first end 144 of the slide rod 140 to overcome the biasing force exerted by the biasing member 142. The notch rod engagement feature 122 may then disengage from a notch 132 to permit the headrest 20 to be moved along the upper portion 26 of the support post 22. For instance, the headrest 20 may be moved along the upper portion 26 of the support post 20 by force applied to the headrest 20 by a user.

The notch rod 104 may rotate back toward the latched position in response to the biasing force exerted by the biasing member 142 when sufficient force is not applied to the first end 144 of the slide rod 140. The notch rod engagement feature 122 may then engage a notch 132 to inhibit movement of the headrest 20 with respect to the support post 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a seat back;
   a support post fixedly disposed on the seat back; and
   a head restraint assembly disposed on the support post, the head restraint assembly including:
      a rear portion moveably disposed on the support post; and
      a front portion pivotally disposed on the rear portion;
   wherein the front portion pivots with respect to the rear portion independently of movement of the rear portion along the support post and wherein the rear portion includes a pivot bar disposed above a top surface of a housing, wherein a friction clip is disposed around a portion of the pivot bar to couple the front portion to the rear portion and wherein the front portion pivots about a first axis of rotation when sufficient force is applied to the front portion to overcome frictional resistance between the friction clip and the pivot bar.

2. The seat assembly of claim 1 wherein the friction clip extends through an opening in a support plate of the front portion.

3. The seat assembly of claim 1 wherein the pivot bar extends between the pair of mounting features.

4. The seat assembly of claim 1 wherein the friction clip includes a curved wall that engages the pivot bar and a slot disposed in the curved wall, and wherein the pivot bar includes a protrusion that extends into the slot and engages the slot to limit rotation of the front portion.

5. The seat assembly of claim 1 wherein the front portion has a support plate that includes a retaining feature and the friction clip includes a first mounting hole that receives the retaining feature to fixedly attach the friction clip to the support plate of the front portion.

6. The seat assembly of claim 1 wherein the friction clip includes a curved wall and first and second walls extending from the curved wall, the first wall having a flange that extends toward the second wall and that includes a flange opening, and the second wall has an end portion having a barb that is disposed in the flange opening to squeeze the curved wall around the pivot bar.

7. A seat assembly comprising:
   a seat back;
   a support post extending from the seat back; and
   a headrest including:
      a rear portion moveably disposed on the support post, the rear portion including:
         a first traverse member fixedly disposed on the support post inside the rear portion;
         a second traverse member moveably disposed on the support post inside the rear portion; and
         a notch rod disposed on the first and second traverse members and configured to rotate about a first axis of rotation between an unlatched position and a latched position to selectively permit and inhibit movement of the second traverse member along the support post, respectively; and
      a front portion disposed on the rear portion and configured to rotate about a second axis of rotation;
   wherein the second axis of rotation is disposed above the notch rod.

8. The seat assembly of claim 7 further comprising an engagement member disposed on the first traverse member that inhibits movement of the rear portion along the support post when the engagement member engages a notch in the notch rod.

9. The seat assembly of claim 8 wherein the engagement member has a plurality of free ends that are configured to engage different notches in the notch rod.

10. The seat assembly of claim 8 wherein the engagement member extends through an aperture in the first traverse member.

11. The seat assembly of claim 7 wherein the notch rod includes an elongated engagement feature and a plurality of notches that are spaced apart from the elongated engagement feature.

12. The seat assembly of claim 7 wherein the first axis of rotation intersects the second axis of rotation.

13. The seat assembly of claim 7 wherein the first axis of rotation is substantially perpendicular to the second axis of rotation.

14. The seat assembly of claim 7 wherein the notch rod extends through an opening in the first traverse member.

15. A seat assembly comprising:
   a seat back;
   a support post disposed on the seat back;
   a headrest disposed above the seat back, the headrest having a rear portion disposed on the support post that includes:
      a housing;
      a first traverse member disposed on the support post within the housing;
      a second traverse member disposed on the housing;
      a notch rod rotatably disposed on the first and second traverse members within the housing;
      a latch subsystem that actuates the notch rod between an unlatched position in which the second traverse member is configured to move with respect to the first traverse member and a latched position in which the second traverse member is inhibited from moving with respect to the first traverse member; and a front portion pivotally coupled to the housing above the notch rod.

16. The seat assembly of claim 15 wherein the latch subsystem is disposed on the second traverse member.

17. The seat assembly of claim 15 wherein the latch subsystem includes a slide rod disposed proximate the second traverse member, the slide rod having a first end disposed proximate an exterior surface of the headrest and a second end disposed opposite the first end that engages the notch rod.

18. The seat assembly of claim 17 wherein the second end includes a pin that is rotatably engaged with the notch rod.

19. The seat assembly of claim 15 wherein the slide rod includes a slide rod protrusion, wherein a biasing member exerts a biasing force on the slide rod protrusion to bias the slide rod protrusion away from the notch rod.

20. The seat assembly of claim 15 wherein the housing includes a pair of mounting features that extend from a top surface, wherein a pivot bar extends between the pair of mounting features to facilitate coupling the front portion to the housing.

* * * * *